Aug. 2, 1966        I. R. MARCUS        3,264,579
TEMPERATURE AND VOLTAGE COMPENSATED MULTIVIBRATOR
Filed Feb. 13, 1964        3 Sheets-Sheet 1
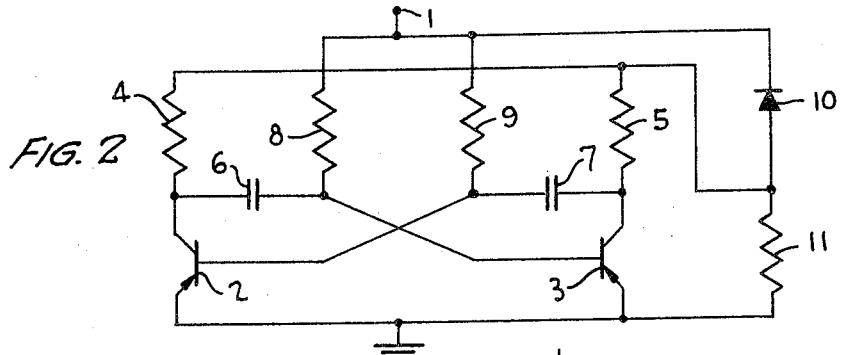
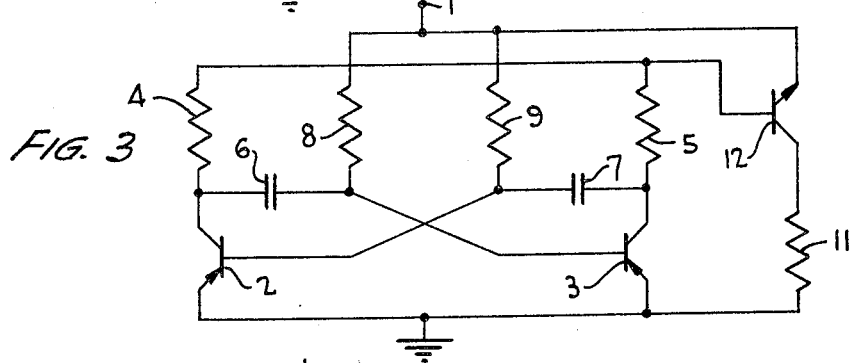
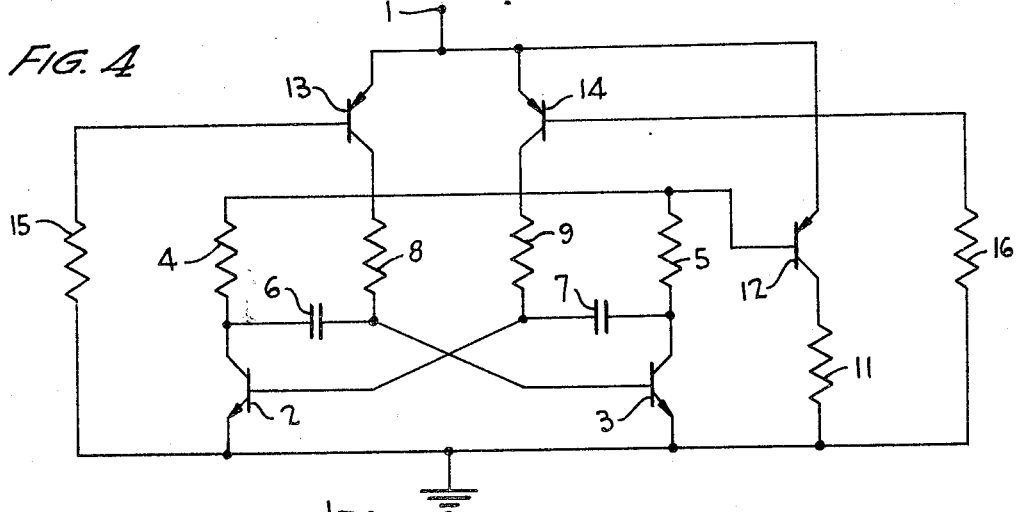
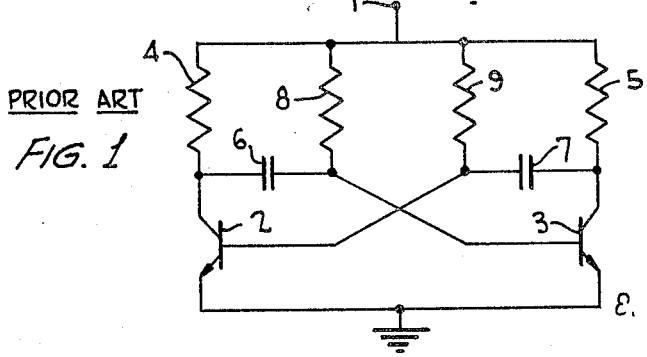
INVENTOR,
IRA R. MARCUS
BY Harry M. Saragovitz,
E. J. Kelly, H. Berl &
J. D. Edgerton ATTORNEYS

INVENTOR,
IRA R. MARCUS

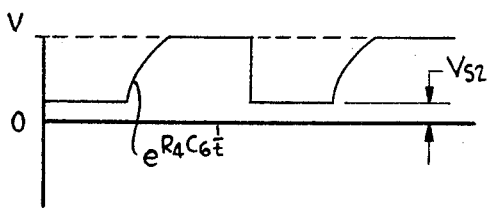
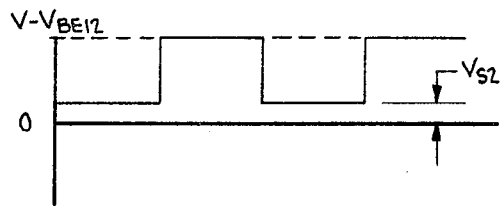
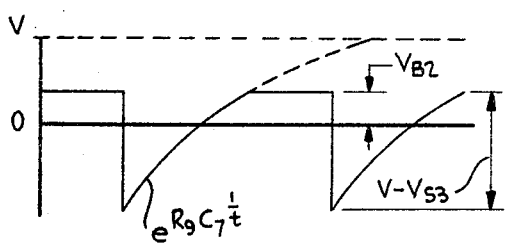
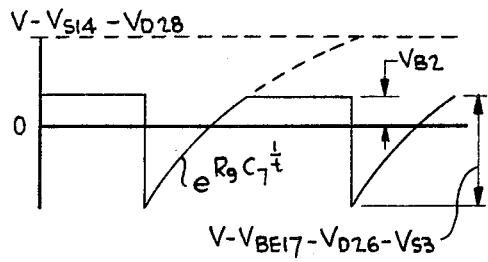
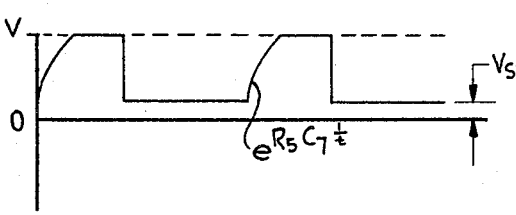
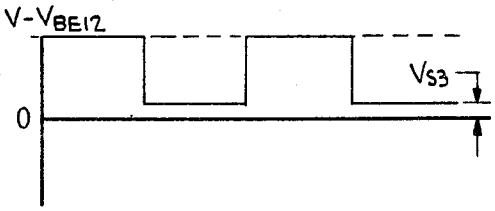
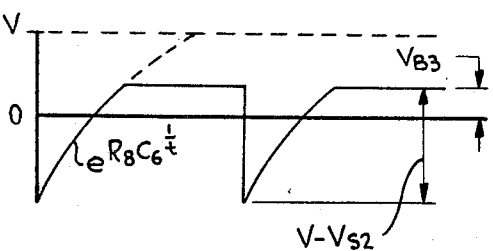
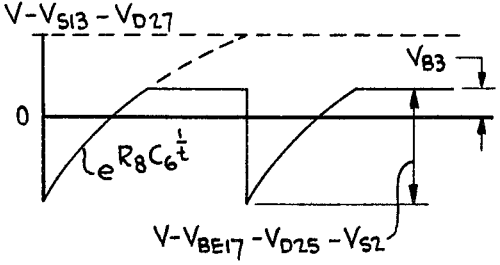

United States Patent Office 3,264,579
Patented August 2, 1966

3,264,579
TEMPERATURE AND VOLTAGE COMPENSATED
MULTIVIBRATOR
Ira R. Marcus, Wheaton, Md., assignor to the United
States of America as represented by the Secretary of
the Army
Filed Feb. 13, 1964, Ser. No. 344,787
4 Claims. (Cl. 331—113)

The invention described herein may be manufactured and used by or for the Government of the United States of America for governmental purposes without the payment to me of any royalty thereon.

This invention relates generally to multivibrator circuits, and more particularly to astable multivibrator circuits having highly stable output frequencies for large variations of ambient temperature and power supply voltage.

In digital electronic timing and programming devices the accuracy of the system depends upon the accuracy of the time base. Often the time base is established by an astable multivibrator. Many digital devices, such as for example field test equipment, timers and control mechanisms, are subjected to large changes in ambient temperature and are not provided with well regulated power supplies. Both changes in temperature and variations in supply voltage affect the frequency of an astable multivibrator.

It is therefore an object of the present invention to provide a temperature compensated multivibrator circuit.

It is another object of the invention to provide an astable multivibrator circuit having an output frequency which is substantially invariant with changes in supply voltage.

It is a further object of the instant invention to provide an astable multivibrator which is both temperature and voltage compensated and provides an output which is a true square wave.

According to the present invention, the foregoing and other objects are attained by providing within an astable multivibrator circuit comprising two transistors, means for supplying voltage to the base circuits of the two transistors which voltage varies in a manner that compensates for the variation in the base to emitter voltages of the transistors due to changes in ambient temperature and supply voltage and means for supplying voltage to the collector circuits of the two transistors which voltage varies in a manner that compensates for the variation in the saturation collector to emitter voltages of the transistors due to changes in ambient temperature and supply voltage.

The specific nature of the invention, as well as other objects, aspects, uses and advantages thereof, will clearly appear from the following description and from the accompanying drawings, in which:

FIG. 1 is a schematic diagram of a typical prior art astable multivibrator circuit;

FIG. 2 is a schematic diagram of a first order temperature and voltage compensated astable multivibrator circuit according to the invention;

FIG. 3 is a schematic diagram of another first order temperature and voltage compensated astable multivibrator circuit according to the invention;

FIG. 4 is a schematic diagram of a second order temperature and voltage compensated astable multivibrator circuit according to the invention;

FIGS. 6A, 6B, 6C and 6D are graphical representations of the waveforms of the astable multivibrator shown in FIGURE 1; and FIGS. 7A, 7B, 7C and 7D are graphical representations of the astable multivibrator shown in FIGURE 5.

Figure 5:
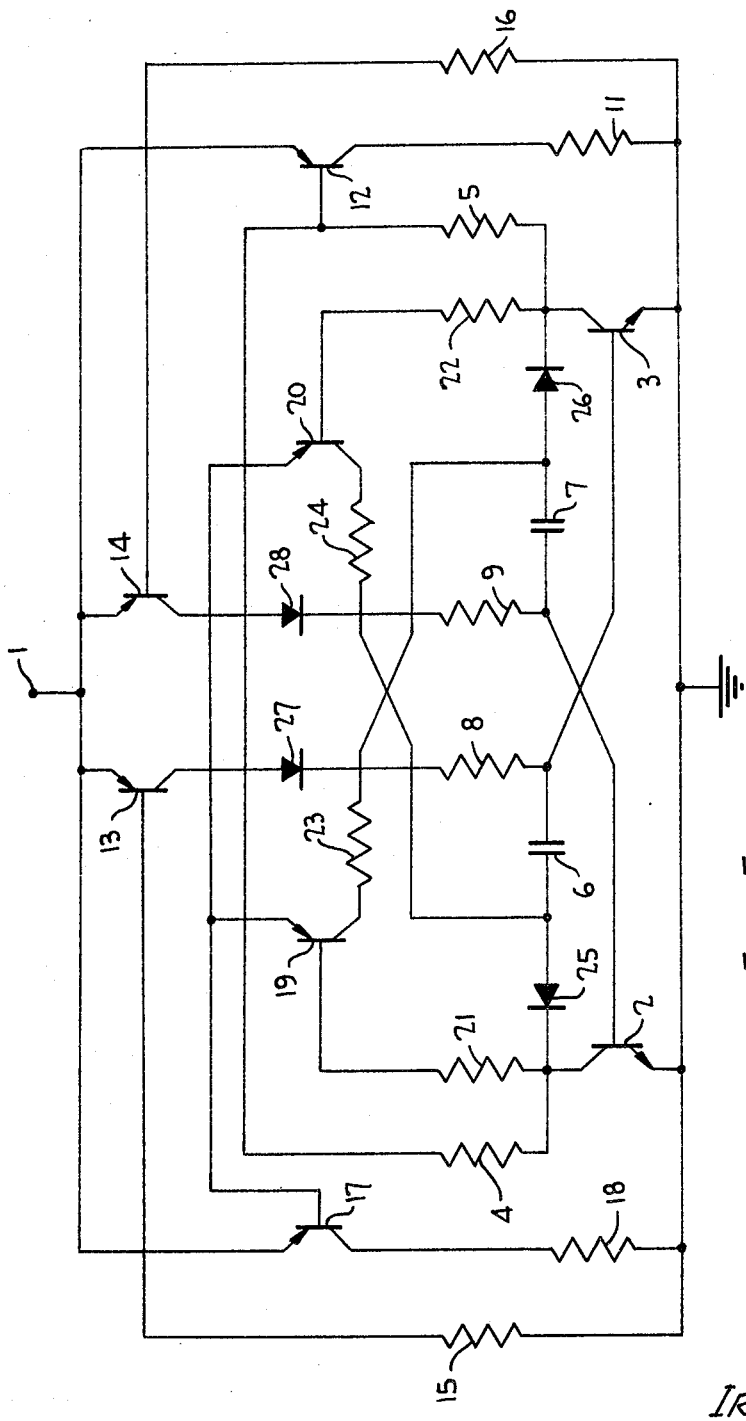
FIG. 5 is a schematic diagram of a second order temperature and voltage compensated astable multivibrator which provides a true square wave output.

Referring now to the drawings wherein like reference numerals designate identical or corresponding parts throughout the several figures, and more particularly to FIGURE 1 wherein there is shown a typical prior art astable multivibrator circuit. This circuit is shown as comprising two NPN transistors 2 and 3 which are powered by a source of positive potential (not shown) connected to terminal 1. Cross-coupling capacitors 6 and 7 interconnect the collectors of transistors 2 and 3, respectively, with the bases of transistors 3 and 2, respectively. Resistors 4 and 5 connect the collectors of transistors 2 and 3, respectively, to terminal 1 while resistors 8 and 9 connect the bases of transistors 2 and 3, respectively, to terminal 1. Briefly, the operation of this circuit is as follows: Assume that transistor 3 has just turned off. The collector to emitter voltage $V_{CE3}$ of transistor 3 then rises from the collector to emitter saturation voltage $V_{s3}$ of transistor 3 to the supply voltage V which is supplied to the circuit at terminal 1 through the charging path comprising resistor 5 and capacitor 7. This is shown in FIGURE 6C, which shows the voltage waveform at the collector of transistor 3. The base to emitter voltage $V_{BE3}$ of transistor 3 also rises from a voltage equal to $-(V-V_{s2}-V_{B3})$, where $V_{s2}$ is the collector to emitter saturation voltage of transistor 2 and $V_{B3}$ is the minimum base to emitter voltage that causes transistor 3 to turn on, toward the supply voltage V through the charging path comprising resistor 8 and capacitor 6. When $V_{BE3}$ reaches voltage $V_{B3}$, transistor 3 turns on, and $V_{CE3}$ drops to $V_{s3}$. This is shown in FIGURES 6C, which shows the voltage waveform at the collector of transistor 3, and 6D, which shows the voltage waveform at the base of transistor 3. The base to emitter voltage $V_{BE2}$ of transistor 2 then drops to a voltage equal to $-(V-V_{s3}-V_{B2})$, where $V_{B2}$ is the minimum base to emitter voltage that causes transistor 2 to turn on, causing transistor 2 to turn off. When transistor 2 turns off, its collector to emitter voltage $V_{CE2}$ rises from $V_{s2}$ to V through the charging path comprising resistor 4 and capacitor 6. This is shown in FIGURE 6A, which shows the voltage waveform at the collector of transistor 2. The base to emitter voltage $V_{BE2}$ of transistor 2 also rises from $$-(V-V_{s3}-V_{B2})$$

through the charging path comprising resistor 9 and capacitor 7 toward supply voltage V. When $V_{BE2}$ reaches $V_{B2}$, transistor 2 turns on causing transistor 3 to turn off since $V_{BE3}$ drops to $-(V-V_{s2}-V_{B3})$. This is shown in FIGURES 6A, which shows the voltage waveform at the collector of transistor 2, and 6B, which shows the voltage waveform at the base of transistor 2. The cycle then repeats. Good design requires resistors 4 and 5 to have a low enough resistance to assure that transistors 2 and 3 saturate when they are on and the time constants $R_4C_6$ and $R_5C_7$ to be less than the time constants $R_9C_7$ and $R_8C_6$, respectively, so that the collector voltages will go to the supply voltage during the times that transistors 2 and 3, respectively, are off.

The period of oscillation of the circuit shown in FIGURE 1 is expressed as follows:

$$P = T_1 + T_2 = R_8 C_6 \ln\left[1 + \frac{V_{B3} + (V - V_{s2} - V_{B3})}{V - V_{B3}}\right]$$
$$+ R_9 C_7 \ln\left[1 + \frac{-V_{B2} + (V - V_{s3} - V_{B2})}{V - V_{B2}}\right]$$

or $$P = R_8 C_6 \ln\left[1 + \frac{V - V_{s2}}{V - V_{B3}}\right] + R_9 C_7 \ln\left[1 - \frac{V - V_{s3}}{V - V_{B2}}\right]$$

where P is the period in seconds, $T_1$ is the time in seconds that transistor 3 is off, $T_2$ is the time in seconds that transistor 2 is off, $R_8$ and $R_9$ are the resistances of resistors 8 and 9, respectively, in ohms, and $C_6$ and $C_7$ are the capacitances of capacitors 6 and 7, respectively, in farads. Assuming that the time constants $R_8C_6$ and $R_9C_7$ are constant for changes in ambient temperature and supply voltage, the condition that the frequency of the circuit of FIGURE 1 is invariant with temperature and voltage requires that the ratios $V-V_{s3}/V-V_{B2}$, and $$V-V_{s2}/V-V_{B3}$$

remain constant. The saturation voltages $V_{s2}$ and $V_{s3}$ and the minimum base to emitter voltages $V_{B2}$ and $V_{B3}$ are, however, dependent on both the supply voltage and the ambient temperature. Compensation for those voltages is therefore required.

FIGURE 2 shows an astable multivibrator circuit which uses a diode to compensate for the minimum base to emitter voltages $V_{B2}$ and $V_{B3}$. This circuit is substantially the same as that shown in FIGURE 1 except that the voltage supplied to the collectors of the transistors 2 and 3 by way of resistors 4 and 5 is derived from a voltage divider comprising diode 10 and resistor 11. Also, the transistors 2 and 3 are the PNP type requiring the voltage supplied at terminal 1 to be negative. If it is assumed that the transistors 2 and 3 are matched, i.e. $V_{B2}=V_{B3}=V_B$ and $V_{s2}=V_{s3}=V_s$, then the period of oscillation of this circuit is expressed as follows:

$$P = (R_8C_6 + R_9C_7) \ln \left[1 + \frac{V-V_D-V_s}{V-V_B}\right]$$

where $V_D$ is the voltage drop across the diode 10. $V_D$ is adjusted to be equal to $V_B$ by adjusting the value of the resistance of resistor 11. $V_s$ is neglected since it is an order of magnitude smaller than $V_B$. Now if diode 10 is chosen so as to have the same temperature coefficient for $V_D$ as that for $V_B$, the ratio $V-V_D/V-V_B$ is substantially constant for changes in ambient temperature. The ratio varies slightly with changes in supply voltage since $V_D$ is affected more by changes in supply voltage than is $V_B$ since the current through diode 10 varies with supply voltage.

FIGURE 3 shows an astable multivibrator circuit which uses a transistor to compensate for the minimum base to emitter voltages $V_{B2}$ and $V_{B3}$. This circuit is substantially the same as the circuit shown in FIGURE 2 except that NPN transistor 12 replaces diode 10. Voltage is supplied to the collectors of transistors 2 and 3 by way of resistors 4 and 5 from the base of transistor 12. Again assuming that transistors 2 and 3 are matched, the period of oscillation of this circuit is expressed as follows:

$$P = (R_8C_6 + R_9C_7) \ln \left[1 - \frac{V-V_{BE12}-V_s}{V-V_B}\right]$$

where $V_{BE12}$ is the base to emitter voltage of transistor 12. $V_{BE12}$ is adjusted to equal $V_B$ by adjusting the value of resistance of resistor 11. Temperature and voltage compensation of this circuit is about the same as that of the circuit shown in FIGURE 2. This circuit, however, requires less power since the resistance of resistor 11 using transistor 12 instead of diode 10 is an order of magnitude larger.

FIGURE 4 shows the first attempt at second order compensation. The circuit is substantially the same as the circuit shown in FIGURE 3 except that transistors 2 and 3 are the NPN type and transistor 12 is the PNP type requiring a positive voltage to be supplied at terminal 1. The circuit additionally includes PNP transistors 13 and 14 having base bias resistors 15 and 16, respectively. Transistors 13 and 14 have their emitters connected to terminal 1 and their collectors connected to resistors 8 and 9, respectively. These transistors are added to compensate for the saturation voltages of transistors 2 and 3. The period of oscillation of this circuit is expressed as follows:

$$P = R_8C_6 \ln \left[1 + \frac{V-V_{BE12}-V_{s2}}{V-V_{B3}-V_{s13}}\right]$$
$$+ R_9C_7 \ln \left[1 + \frac{V-V_{BE12}-V_{s3}}{V-V_{B2}-V_{s14}}\right]$$

where $V_{s13}$ and $V_{s14}$ are the collector to emitter saturation voltages of transistors 13 and 14, respectively. If $$V_{s2}=V_{s13}, \quad V_{s3}=V_{s14}$$

and $$V_{B2}=V_{B3}=V_{B12}$$

then the ratios $$\frac{V-V_{BE2}-V_{s2}}{V-V_{B3}-V_{s13}}$$

and $$\frac{V-V_{BE12}-V_{s3}}{V-V_{B2}-V_{s14}}$$

are constant and the frequency is stable with changes in ambient temperature and power supply voltage. $V_s$ and $V_B$, however, depend on operating points determined by base and collector resistors; therefore, the condition assumed above requires that all the resistors in the circuit be equal. This is because resistors 8 and 9 are the base resistors of transistors 2 and 3, respectively, and at the same time are the collector resistors of transistors 13 and 14, respectively. Similarly, resistors 4 and 5 are the base resistors of transistor 12 and the collector resistors of transistors 2 and 3, respectively. With all the resistances equal, the circuit no longer oscillates since reliable operation requires that the time constants $R_4C_6$ and $R_5C_7$ be much less than the time constants $R_9C_7$ and $R_8C_6$, respectively.

FIGURE 5 shows the circuit of FIGURE 4 modified so as to allow oscillation with the resistances of resistors 4, 5, 8 and 9 equal.

In FIGURE 5, it will be understood that the elements identified by numerals between 1 and 16 inclusive correspond to the elements of FIGURE 4 having like numerals. Thus the purpose for which transistor 12 in FIGURE 5 is utilized corresponds to the purpose for which transistor 12 in FIGURE 4, and also transistor 12 in FIGURE 3, is utilized; transistor 12, in combination with resistor 11, produces a controlled voltage at the base of transistor 12 that compensates, in a manner that would not occur if resistors 4 and 5 were connected directly to source 1, for changes in temperature and for changes in the voltage supplied to source 1.

In FIGURE 5 transistors 19 and 20 have base resistors 21 and 22, respectively, which are also collector resistors of transistors 2 and 3, respectively. Transistor 17 and resistor 18 form a voltage divider for supplying voltage to the emitters of transistors 19 and 20. Transistor 19 is biased to conduct when transistor 2 is on. Under this condition, capacitor 7 is charged through resistor 23, transistor 19, and transistor 17 from the voltage source connected to terminal 1. Resistor 23 is smaller than resistor 5; therefore, the time constant $R_{23}C_7$ is small compared with the time constant $R_5C_7$. Similarly, transistor 20 is biased to conduct when transistor 3 is on. Capacitor 6 is then charged through resistor 24, transistor 20, and transistor 17 from the voltage source connected to terminal 1. Resistor 24 is smaller than resistor 4; therefore the time constant $R_{24}C_6$ is small compared with the time constant $R_4C_6$. Compensation is not required for the collector to emitter saturation voltages $V_{s19}$ and $V_{s20}$ of transistors 19 and 20 because they vanish when the charging currents through them go to zero. Diodes 25 and 26 are used to isolate $R_4$ from $C_6$ and $R_5$ from $C_7$, respectively. Diodes 27 and 28 are added to compensate for the voltages $V_{D25}$ and $V_{D26}$ across diodes 25 and 26, respectively. Briefly, the operation of this circuit is as follows: Assume that transistor 3 has just turned off. The collector to emitter voltage $V_{CE3}$ of transistor 3 then rises substantially instantaneously from the collector to emitter saturation voltage $V_{s3}$ of transistor 3 to the voltage equal to $V-V_{BE12}$, where V is the supply voltage at terminal 1 and $V_{BE12}$ is the base to emitter voltage of transistor 12. This is shown in FIGURE 7C, which shows the voltage waveform at the collector of transistor 3. The base to emitter voltage $V_{BE3}$ of transistor 3 also rises from a voltage equal to $-(V-V_{BE17}-V_{D25}-V_{s2}-V_{B3})$, where $V_{BE17}$ is the base of emitter voltage of transistor 17, $V_{D25}$ is the voltage across diode 25, $V_{s2}$ is the collector to emitter saturation voltage of transistor 2, and $V_{B3}$ is the minimum base to emitter voltage that causes transistor 3 to turn on, toward a voltage equal to $V-V_{s13}-V_{D27}$, where $V_{s13}$ is the collector to emitter saturation voltage of transistor 13 and $V_{D27}$ is the voltage across diode 27, through the charging path comprising resistor 8 and capacitor 6. When $V_{BE3}$ reaches voltage $V_{B3}$, transistor 3 turns on, and $V_{CE3}$ drops to $V_{s3}$. This is shown in FIGURES 7C, which shows the voltage waveform at the collector of transistor 3, and 7D, which shows the voltage waveform at the base of transistor 3. The base to emitter voltage $V_{BE2}$ of transistor 2 then drops to a voltage equal to $-(V-V_{BE17}-V_{D26}-V_{s3}-V_{B2})$, where $V_{D26}$ is the voltage across diode 26 and $V_{B2}$ is the minimum base to emitter voltage that causes transistor 2 to turn on, causing transistor 2 to turn off. When transistor 2 turns off, its collector to emitter voltage $V_{CE2}$ rises substantially instantaneously from $V_{s2}$ to $V-V_{BE12}$. This is shown in FIGURE 7A, which shows the voltage waveform at the collector of transistor 2. The base to emitter voltage $V_{BE2}$ of transistor 2 also rises from $$-(V-V_{BE17}-V_{D26}-V_{s3}-V_{B2})$$

through the charging path comprising resistor 9 and capacitor 7 toward a voltage equal to $V-V_{s14}-V_{D28}$, where $V_{s14}$ is the collector to emitter saturation voltage of transistor 14 and $V_{D28}$ is the voltage across diode 28. When $V_{BE2}$ reaches $V_{B2}$, transistor 2 turns on causing transistor 3 to turn off since $V_{BE3}$ drops to $$-(V-V_{BE17}-V_{D25}-V_{s2}-V_{B3})$$

This is shown in FIGURES 7A, which shows the voltage waveform at the collector of transistor 2, and 7B, which shows the voltage waveform at the base of transistor 2. The cycle then repeats. It is to be noted that the waveforms at the collectors of transistors 2 and 3 are true square waves.

The period of oscillation of the circuit shown in FIGURE 5 is expressed as follows:

$$P = R_9 C_7 \ln\left[1 - \frac{V-V_{BE17}-V_{D26}-V_{s3}}{V-V_{B2}-V_{D28}-V_{s14}}\right]$$
$$+ R_8 C_6 \ln\left[1 - \frac{V-V_{BE17}-V_{D25}-V_{s2}}{V-V_{B3}-V_{D27}-V_{s13}}\right]$$

For voltage and temperature compensation the following parameters are matched: $V_{s3}$ and $V_{s14}$; $V_{s2}$ and $V_{s13}$; $V_{BE17}$, $V_{B2}$ and $V_{B3}$; $V_{D26}$ and $V_{D28}$; and $V_{D25}$ and $V_{D27}$. The resistors 8 and 9 and the capacitors 6 and 7 are temperature compensated.

It will be apparent that the embodiments shown are only exemplary and that various modifications can be made in construction and arrangement within the scope of the invention as defined in the appended claims.

I claim as my invention:

1. In an astable multivibrator having a first transistor and a second transistor each of said first and second transistors having a base electrode, an emitter electrode, and a collector electrode, said emitter electrodes being connected to circuit ground, a first capacitor connected to the collector electrode of said first transistor and to the base electrode of said second transistor, a second capacitor connected to the collector electrode of said second transistor and to the base electrode of said first transistor, a source of voltage, a first resistor having first and second terminals, said first terminal connected to the collector electrode of said first transistor, a second resistor having first and second terminals, said first terminal of said second resistor connected to the collector electrode of said second transistor, a third resistor having first and second terminals, said first terminal of said third resistor connected to the base electrode of said first transistor and said second terminal of said third resistor connected to said source of voltage, a fourth resistor having first and second terminals, said first terminal of said fourth resistor connected to the base electrode of said second transistor and said second terminal of said fourth resistor connected to said source of voltage, an improved voltage-controlling device for supplying a controlled voltage to said first and second resistors, said device comprising:

(a) a third transistor having its emitter connected to said source of voltage and its base connected to said second terminal of said first resistor and said second terminal of said second resistor; and (b) a fifth resistor connected between the collector of said third transistor and circuit ground, the value of said fifth resistor being such as to cause the base-to-emitter voltage of said third transistor to be equal to the minimum base-to-emitter voltage which causes said first and second transistors to conduct.

2. The improvement recited in claim 1 further comprising a first semiconductor device interposed between said source of voltage and said third resistor and a second semiconductor device interposed between said source of voltage and said fourth resistor, the voltage drop across said first semiconductor device being equal to the collector to emitter saturation voltage of said second transistor and the voltage drop across said second semiconductor device being equal to the collector to emitter saturation voltage of said first transistor.

3. The improvement recited in claim 2 where said first semiconductor device is a fourth transistor and said second semiconductor device is a fifth transistor, each of said fourth and said fifth transistors having a base electrode, an emitter electrode, and a collector electrode, and further comprising a sixth resistor and a seventh resistor, said sixth resistor being connected between said base electrode of said fourth transistor and ground for supplying a base bias voltage to said fourth transistor, said seventh resistor being connected between said base electrode of said fifth transistor and ground for supplying a base bias voltage to said fifth transistor, said source of voltage being connected to both said emitter electrodes of said fourth and fifth transistors, said third resistor being connected to said collector electrode of said fourth transistor, and said fourth resistor being connected to said collector electrode of said fifth transistor.

4. The improvement recited in claim 3 wherein said first, second, third, and fourth resistors have equal resistance values, said improvement further comprising first means connected between said first resistor and said first capacitor for isolating said first resistor from said first capacitor, second means connected between said second resistor and said second capacitor for isolating said second resistor from said second capacitor, third means connected between said source of voltage and said first capacitor for charging said first capacitor when said first transistor is not conducting, and fourth means connected between said source of voltage and said second capacitor for charging said second capacitor when said second transistor is not conducting.

References Cited by the Examiner

UNITED STATES PATENTS 3,178,658    4/1965    Henrion _____ 331—113 X

ROY LAKE, *Primary Examiner.*

J. B. MULLINS, *Assistant Examiner.*